(12) United States Patent
Grzeszczuk

(10) Patent No.: US 6,229,547 B1
(45) Date of Patent: May 8, 2001

(54) SYSTEM AND METHOD FOR RENDERING MULTI-PLANAR REFORMATIONS USING BI-LINEAR INTERPOLATION

(75) Inventor: Robert Grzeszczuk, Menlo Park, CA (US)

(73) Assignee: Silicon Graphics, Inc., Mountain View, CA (US)

( * ) Notice: Subject to any disclaimer, the term of this patent is extended or adjusted under 35 U.S.C. 154(b) by 0 days.

(21) Appl. No.: 09/173,559

(22) Filed: Oct. 16, 1998

(51) Int. Cl.[7] ................................................... G06F 15/00
(52) U.S. Cl. ............................................................ 345/419
(58) Field of Search .................................. 345/419, 435, 345/431, 442, 443, 113, 114

(56) References Cited

U.S. PATENT DOCUMENTS 5,237,650 * 8/1993 Priem et al. .......................... 345/443
5,404,431 * 4/1995 Kumazaki et al. ................... 345/443

OTHER PUBLICATIONS

Grzeszczuk, R. et al., SIGGRAPH98 Course Notes, Advanced Geometric Techniques for Ray Casting Volumes, *ACM SIGGRAPH*, 239 pages, Apr. 20, 1998.

* cited by examiner

*Primary Examiner*—Phu K. Nguyen
(74) *Attorney, Agent, or Firm*—Sterne, Kessler, Goldstein & Fox P.L.L.C.

(57) ABSTRACT

A view port comprising an oblique slice intersecting a stack of textured images is defined. A polygon associated with the view port slice is divided into multiple polygons, wherein each polygon is clipped to the surface of each intersecting texture. Each intersecting texture is then enabled, one at a time. When each texture is enabled, each polygon intersecting with the enabled texture is drawn. The colors of the vertices that fall within the active textures are maintained according to the color of the active texture, and the colors of the vertices that fall within the inactive texture are set to zero. This process is repeated until all of the intersecting textures have been enabled. This causes each polygon to be drawn exactly twice. Additive blending is enabled so that the first and second polygons are blended together. When each polygon is drawn, bi-linear interpolation techniques are used to fill-in the colors of the texels that lie in between the vertices of the polygon. The second time the polygon is drawn, the opposite texture used to draw the first polygon becomes the active texture. The first and second polygons are then blended together, resulting in a properly filtered averaged three dimensional image that is rendered using only bi-linear interpolation techniques.

9 Claims, 7 Drawing Sheets

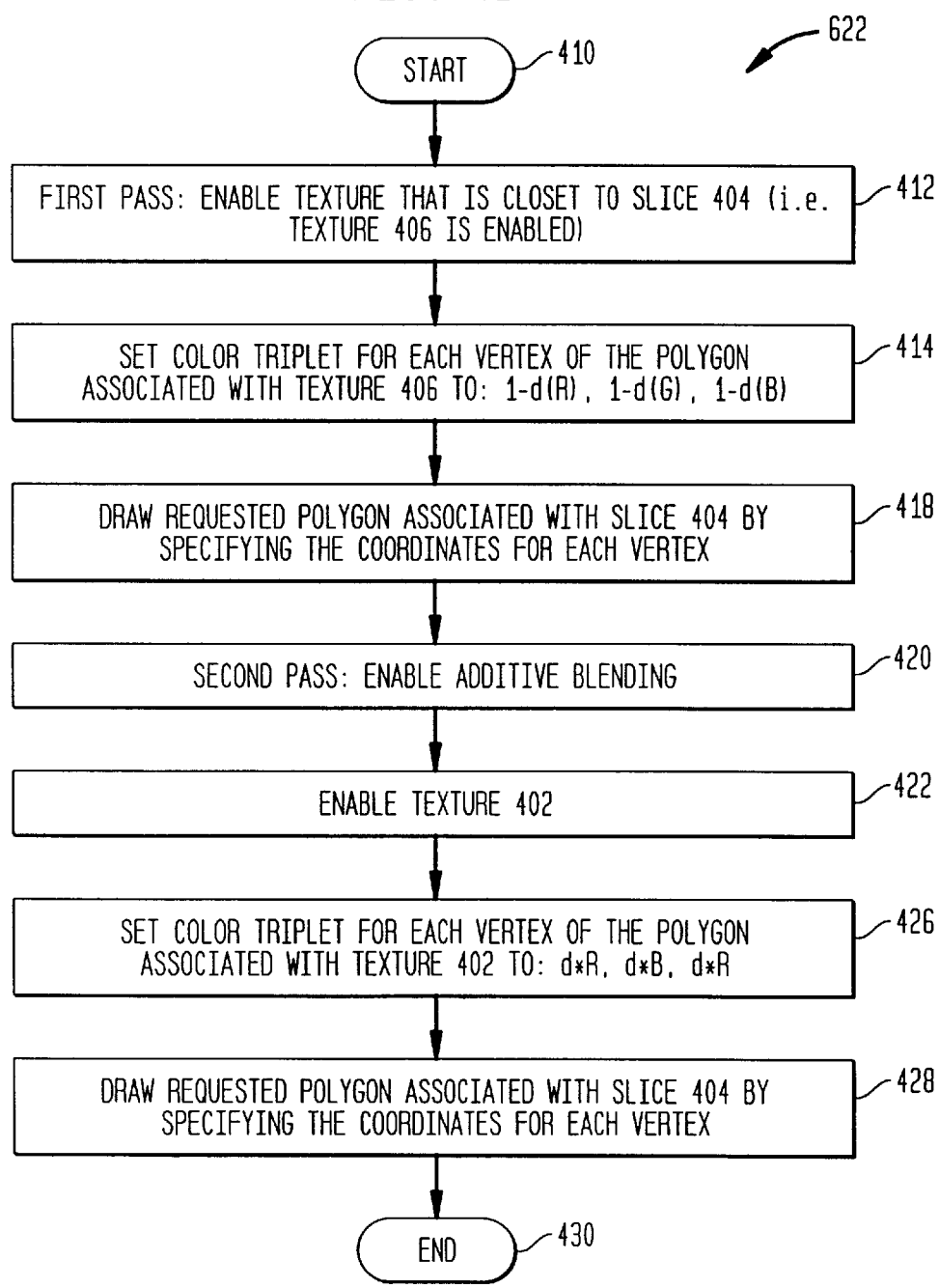

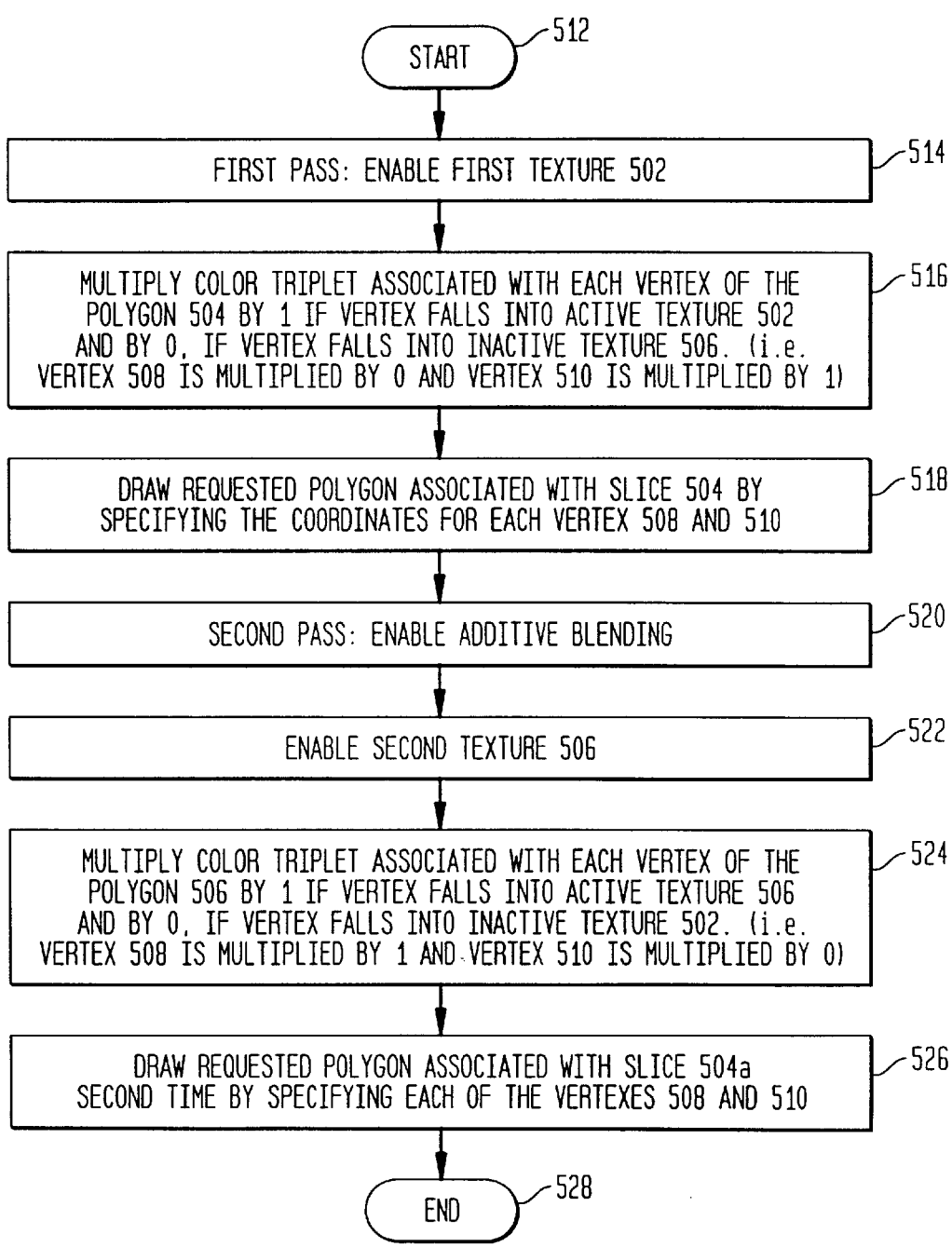

SYSTEM AND METHOD FOR RENDERING MULTI-PLANAR REFORMATIONS USING BI-LINEAR INTERPOLATION

BACKGROUND OF THE INVENTION

1. Field of the Invention

The present invention relates generally to computer graphics, and more particularly to an improved system and method for rendering arbitrarily oriented three dimensional cross sections of a volumetric data set comprising stacks of two dimensional images.

2. Related Art

The increased use of volume rendering of three-dimensional (3D) images by graphics computers is apparent in today's society. In one example, the medical industry uses this technique to diagnose patients by viewing internal images of the human body generated from magnetic resonance imaging (MRI) devices, computerized tomography (CT) scanning devices, and the like. In another example, geologists and seismologists use this technique to view internal images of our planet for locating untapped natural resources, and for predicting earthquakes and other phenomena Many other scientific disciplines use this technology for performing scientific visualizations that have not been possible before the advent of this important technology.

Computer generated volume rendering of three-dimensional (3D) images is generally formed from a plurality of stacks of two-dimensional (2D) images. For example, in the medical discipline, MRI devices are used to view images of various internal organs of the human body. 3D images of the internal organs are created from a series of 2D images, wherein each image is a cross-section at a particular depth. As the term is used herein, "3D images" are defined as arbitrarily oriented three-dimensional cross-sectional images.

The images are stacked on top of one another and are aligned in a plane coincident to the axis used to acquire the images (i.e. the image plane, or the acquisition plane). MRI images, for example are acquired by performing a series of scans in a fixed direction along the X, Y or Z axis. Thus, for example, scans made along the Z axis produce a series of images in the X-Y image plane. Scans made along the X axis, produce a series of images in the Y-Z image plane. Scans made along the Y axis, produce a series of images in the X-Z plane. As the term is used herein, "3D images" are defined arbitrarily oriented 3D cross-sectional images.

Generally, computer systems with 3D hardware accelerators are used to render 3D textured images in real-time from the acquired images. The 3D images are generated from user defined view ports within the volumetric data set which comprises the stack of 2D images. These 3D images are formed using texture mapping techniques that are well known in the art. Specifically, texture maps representing each image are stored in a computer memory device. Once these texture maps are stored, users can selectively display a 3D image rendered from one of more of the texture maps by defining a particular view port for the image. A particular view port is defined by specifying the size and orientation of a slice that intersects the series of stacked images.

When a requested slice coincides with any one of the acquired images, a properly filtered 3D image can be rendered using only bi-linear interpolation techniques. However when a requested slice is oblique, (i.e. a slice does not coincide with the image plane), 3D texture mapping using tri-linear interpolation techniques are required. Rendering oblique slices are referred to as multi-planar reformations.

On computer systems that support 3D texture mapping, rendering an image associated with an oblique slice is a rather straight forward proposition. The slicing plane is clipped to the volumes geometry and the resulting polygons are drawn with 3D texturing enabled. However, on computer systems that do not support 3D texture mapping, a 3D image associated with an oblique slice cannot be performed in an efficient manner.

The problem is that many general purpose computer systems do not support hardware accelerated 3D texture mapping using tri-linear interpolation. Hardware graphic accelerator devices that do support tri-linear interpolation are still considered specialty, high-end devices and are very expensive.

However, it would be desirable to use the wide variety of general purpose computer systems readily available today for viewing these 3D images. For example, doctors and other scientists would be able to more easily disseminate and share such images with other colleagues and other individuals for consultation purposes and the like.

One way to overcome this problem is to use software rendering techniques for performing the necessary tri-linear interpolation general purpose computer systems. However, using even the fastest microprocessors available today, tri-linear interpolation software rendering techniques tend to be too slow to be of any practical use in real-time applications.

Recently, a wide variety of affordable consumer level graphic hardware acceleration devices have become available for use in general purpose computer systems. However, these devices are somewhat limited. Specifically, these devices typically support, among other features, 2D texture mapping and bi4linear interpolation, but do not generally support 3D texture mapping and tri-linear interpolation.

Thus, what is needed is a system and method for rendering 3D images associated with oblique slices in volumetric data sets, that can be efficiently performed using affordable graphic accelerators that do not support 3D texture mapping and tri-linear interpolation

SUMMARY OF THE INVENTION

Accordingly, the present invention is directed toward an improved system and method for rendering arbitrarily oriented three dimensional cross sections of a volumetric data set comprising axially aligned parallel stacks of two dimensional textured images. A view port comprising an oblique slice intersecting the stack of textured images is defined. The polygon associated with the view port slice is divided into multiple polygons, wherein each polygon is clipped to the surface of each intersecting texture.

Each intersecting texture is then enabled, one at a time. When each texture is enabled, each polygon intersecting with the enabled texture is drawn. The colors of the vertices that fall within the active textures are maintained according to the color of the active texture, and the colors of the vertices that fall within the inactive texture are set to zero. This process is repeated until all of the intersecting textures have been enabled. This causes each polygon to be drawn exactly twice. Additive blending is enabled so that the first and second polygons are blended together.

When each polygon is drawn, bi-linear interpolation techniques are used to fill-in the colors of the texels that lie in between the vertices of the polygon. Accordingly, the active textures that are mapped onto polygons are effectively multiplied by a linear ramp that increases in intensity as the parts of the polygon approach the active texture and decreases in intensity as the parts of the polygon move away from the active texture.

The second time the polygon is drawn, the opposite texture used to draw the first polygon becomes the active texture. Thus, the texture that is mapped into the second polygon is effectively multiplied by a linear ramp that is the reverse of the first linear ramp associated with the first polygon. The first and second polygons are then blended together, resulting in a properly filtered averaged three dimensional image that is rendered using only bi-linear interpolation techniques.

An article that describes the techniques presented herein can be found in "*SIGGRAPH*98 *Course Notes, Advanced Techniques for Ray Casting Volumes Section* 3.9, *Polygonizing Arbitrary Cross Sections (MPRs),* " published by ACM SIGGRAPH, Jul. 19, 1998. This article was written by the inventor of the present invention, Robert Grzeszczuk, and is incorporated herein by reference.

BRIEF DESCRIPTION OF THE FIGURES

The present invention is described with reference to the accompanying drawings, wherein:

FIGS. 4A and 4B is a block diagram and a flowchart depicting a process that can be used for rendering a properly filtered image of a slice that is parallel to the acquisition plane, but not coincident with any of the individual images using only bi-linear interpolation techniques;

FIGS. 5A and 5B is a block diagram and a flowchart depicting a process that can be used for rendering a properly filtered image of a slice that intersects two parallel textures using only bi-linear interpolation techniques;

DETAILED DESCRIPTION OF THE PREFERRED EMBODIMENTS

The present invention is directed toward a system and method for volume rendering of three-dimensional textured images of oblique slices using only bi-linear interpolation techniques. The present invention can be implemented using many types of computer graphics systems, including a general purpose computer system with a commonly available three dimensional graphics accelerator installed therein. Many of the features of the present invention can be implemented with the use of a graphics Application Programming Interface (API), for sending commands to the graphics system. Examples of such APIs include OpenG™ by Silicon Graphics, Inc, and DirectX™ by Microsoft, Inc.

Of course, these specific graphics APIs are recited as examples which can support the present invention, but do not necessarily have to have the present invention to operate. For example, an OpenGL™ graphics API architecture does not require use of the present invention. In other words, an OpenGL™ graphics API architecture can provide volume rendering or other computation without using the advantages of the present invention as described herein.

Figure 1:
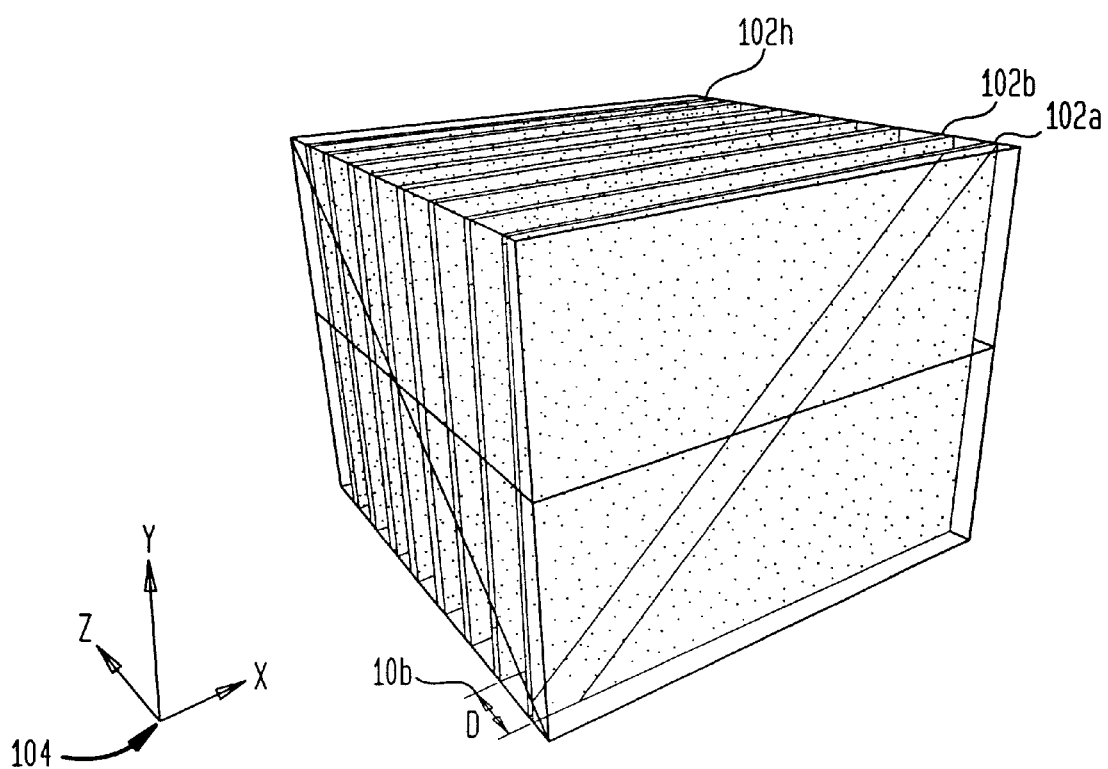
FIGS. 1–3 are diagrams that are useful for describing the orientation of images associated with volumetric data sets used with the present invention.
Figure 2:
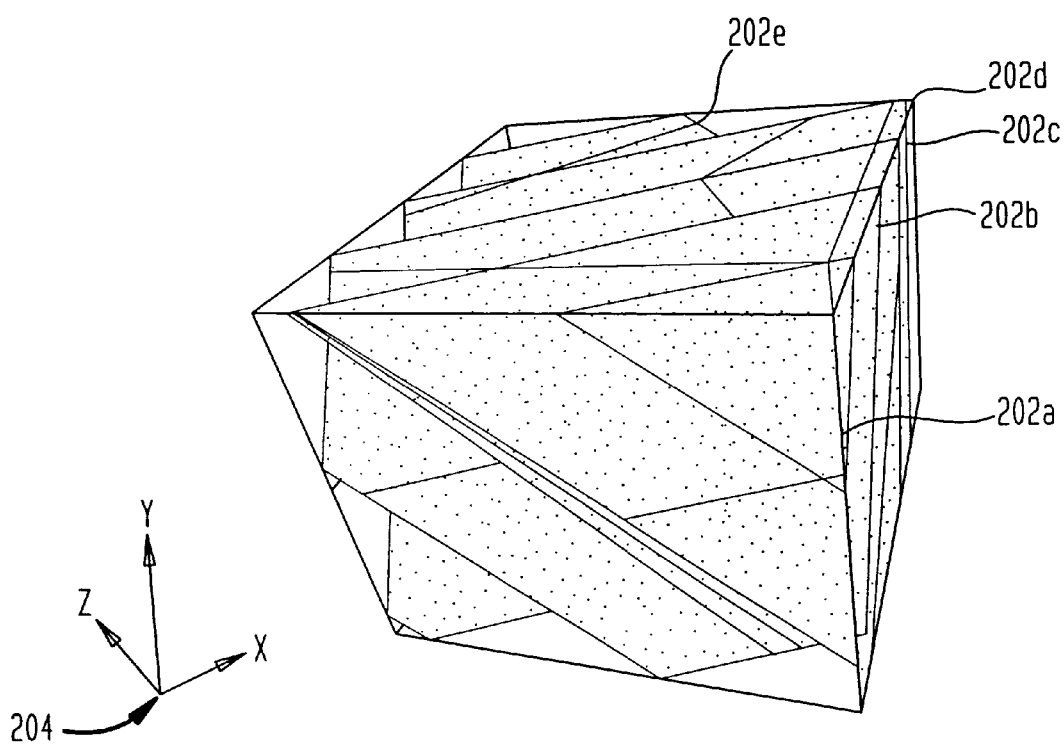
Figure 3:
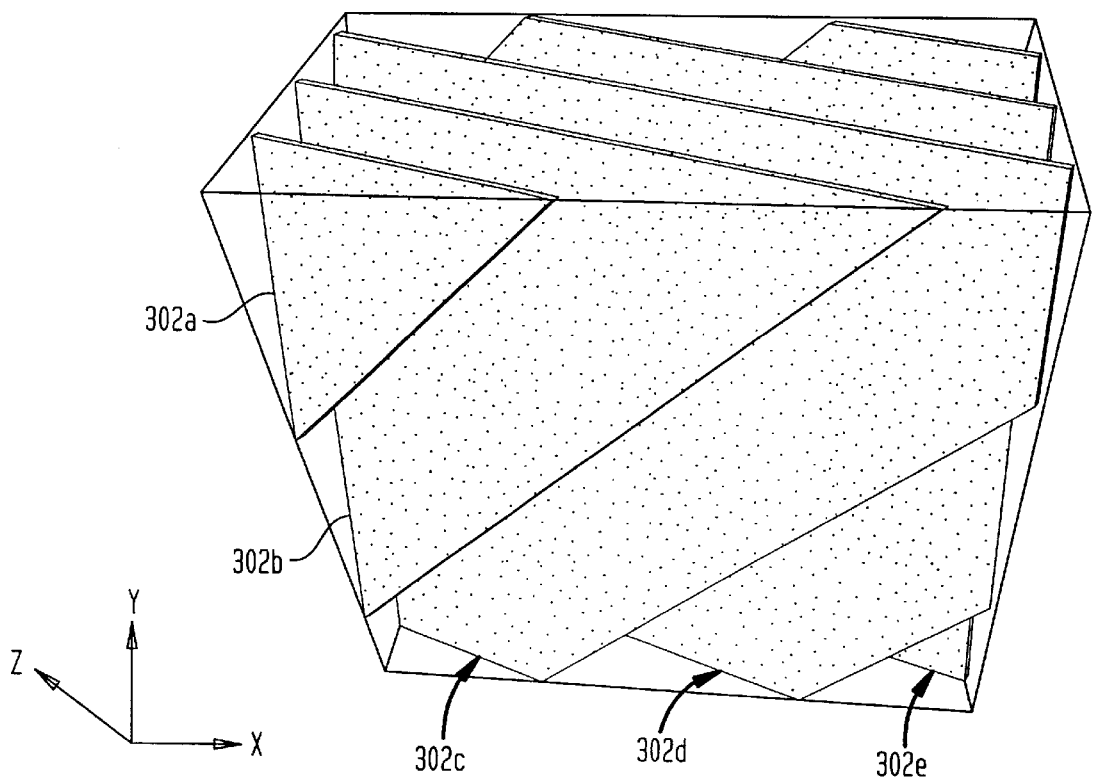

FIGS. 1–3 are diagrams that are useful for describing the orientation of images associated with volumetric data sets used with the present invention. In particular FIGS. 1–3 are presented to describe axial aligned slices and oblique slices.

FIG. 1 depicts an example of a plurality of images 102*a*–102*h* that are axial aligned. Specifically, the images 102*a*–102*h* are aligned with the Z axis, as shown by the orientation of the axes 104. The image or acquisition plane in this example, is the X-Y plane. These images 102*a*–102*h* are an example of images that are consistent with a series of MRI scans taken long the Z axis. The series of stacked images 102*a*–102*h* are at a fixed distance from each other along the Z axis. This distance is denoted in FIG. 1 by the letter D 106. It should be noted that in a typical series of MRI images, there may be on the order of 100 images that are on the order of 1 millimeter apart.

FIG. 2 depicts an example of a plurality of slices 202*a*–202*e* that are oblique. That is, the oblique slices 202*a*–202*e* are not aligned with the image plane. This example shows the resulting images that may be generated from oblique slices defined for the volumetric data set shown in FIG. 1.

FIG. 3 depicts another example of a plurality of oblique slices 302*a*–302*e*, that depict an illustration of a series of MRI scans of a human brain. The oblique slices 302*a*–303*e* shown in FIG. 3 are also cut-away to aid in the present description.

As stated above, bi-linear interpolation techniques can be used to render properly filtered 3D images that are associated with slices that are coincident with the image plane, as shown in FIG. 1. However, using conventional methods, 3D texture mapping using tri-linear interpolation is required to render images associated with the oblique slices, as shown in FIGS. 2 and 3.

With use of the figures below, a technique will now be described for rendering oblique slices in an efficient manner using only bi-linear interpolation FIG. 4A depicts a side view of a stack of 2D textures 402 and 406. Note that in this example, each texture 402 and 406 is bound to a polygon that is typically defined by four vertices (not shown) that lie within the image plane. In this example, the image plane is a horizontal plane, perpendicular to the page. Similarly, the slice 404 is defined by a polygon having four vertices corresponding with the view port defined by a user.

As stated above, bi-linear interpolation techniques can be used to generate images corresponding with any of the image slices. That is, bi-linear interpolation techniques can be used to render a properly filtered image of a slice or view port, that is coincident with either of the images 402 or 406.

Further, it can be shown that an averaging technique can be used to render a properly filtered image of a slice that is parallel to the acquisition plane, but not coincident with any of the individual images (402 and 406), using only bi-linear interpolation techniques. An example of such a slice is the slice 404. This technique is described with reference to the diagram and flowchart in FIGS. 4A and 4B, respectively. Using this process, the slice 404 is rendered using a computed weighted average of the two textures 402 and 406, based on their relative proximity to slice 404.

The process begins with step 410, where control immediately passes to step 412. In step 412, the process enables the texture that is closest to the slice 404. In this example, the texture 406 is enabled. As is well known in the art, enabling a texture tells the hardware accelerator to load the texture into active texture memory. The active texture is then mapped onto subsequently drawn polygons.

Next, as step 414 indicates, the color value of each vertex of the polygon associated with the slice 404 is calculated based on the contribution from the active texture 406. That is, the closer the slice 404 is to the texture 406, the greater the contribution.

To determine the contribution from texture 406 on the slice 404, the color of each vertex of the polygon associated with the slice 404 is multiplied by a factor of(1-d), where d is the distance between the slice 404 and the texture 406, and (1 -d) is the distance between the slice 404 and the texture 402. Thus, using this equation, it can be seen that as the slice 404 moves away from the texture 406, the value of (1-d) approaches zero, and the contribution from the texture 406 to the slice 404 decreases. Conversely, as the slice 404 moves closer to the texture 406, the value (1-d) approaches 1, and the contribution from the texture 406 to the slice 404 increases.

Thus, in step 412, the following equation is applied to the color triplets at each of the vertices of the polygon associated with the slice 404:

$$R_{404} = (1-d) * R_{406}$$
$$G_{404} = (1-d) * G_{406}.$$
$$B_{404} = (1-d) * B_{406}$$

Equation 1

It should be noted that RGB triplets are used to represent colors in the examples presented herein. An RGB triplet represents colors as levels of red (R), green (G), and blue (B) in RGB color space. RGB color space is commonly used in color computer graphics. However, this convention is just one example of a means to represent colors in one embodiment of the present invention. As is well known in the art, many other types of color spaces exist. For example, in YUV color space, colors are represented by an intensity (Y) component and two color difference components (U and V). YUV color space is commonly used in video equipment and was developed to accommodate both grey scale and color images. Other color spaces include CMYK, HSI, HSV, and grey scales. Accordingly, the use of RGB triplets used to describe the example embodiment should not be construed to limit the scope and breadth of the present intention.

It should be understood, that the same method described herein is used to adjust colors using any type of color representation. For example, in one embodiment, a grey scale is used to represent 'colors'. This is a common type of representation typically used for MRI imaging systems and the like. Accordingly, referring back to step 414, the factor (1-d) would be used in exactly the same manner as described above, to adjust the value of the grey scale image. That is, in step 414, the factor (1-d) is multiplied by the grey scale value at each of vertices associated with the texture polygon 406. In a similar fashion, all of the methods presented herein can be used in other embodiments that employ other types of color and grey scale representations.

Once the color of the vertices have been calculated in step 414, the requested polygon associated with the slice 404 is drawn. In this example, 4 vertices are used to represent the slice 404. The hardware graphics accelerator then draws the polygon associated with the 4 vertices specified for the slice 404, and automatically maps the active texture 406 to the polygon 404, to thereby render a first image.

Note that the colors of the vertices have been adjusted, according to the contribution from the active texture 406. Note that only the colors of the vertices have been specified. Accordingly, the hardware graphics accelerator device, uses bi-linear interpolation techniques to adjust the color of the texels that lie between the vertices of the polygon 404, in accordance with the specified color of the vertices. Bi-linear interpolation is a well know technique that uses weighed averaging to derive colors for the texels that lie between the vertices of a polygon.

Next, as step 420 indicates, a feature referred to as additive blending is enabled. Additive blending is a feature that is available in most graphic accelerators, including low-end consumer level devices. This feature is used to blend one or more polygons together in a additive fashion.

After additive blending is enabled, control passes to step 422. In step 422, the second texture, namely texture 402, is enabled. Next, as step 426 indicates, the color value of each vertex of the polygon associated with the slice 404 is calculated based on the contribution from the active texture 402.

Accordingly, in step 426, the following equation is applied to the color triplets at the vertices of the polygon associated with the slice 404:

$$R_{404} = (d) * R_{402}$$
$$G_{404} = (d) * G_{402}.$$
$$B_{404} = (d) * B_{402}$$

Equation 2

Next, in step 428, the requested polygon associated with the slice 408 is drawn a second time. Because additive blending was enabled in step 420, the second polygon drawn in step 428 is added to the polygon drawn in step 418, resulting in a weighted average of the textures 402 and 406, as follows:

$$R_{404} = (1-d) * R_{406} + (d) * R_{402}$$
$$G_{404} = (1-d) * G_{406} + (d) * G_{402}.$$
$$B_{404} = (1-d) * B_{406} + (d) * B_{402}$$

Equation 3

Note that the above process is applied to calculate the color for each of the vertices in the polygon 404. As stated, in the examples used herein, each polygon has 4 vertices. However, this is just one example embodiment of the present invention. In other embodiments, polygons may be defined having an arbitrary number of vertices. Accordingly, these examples should not be construed to limit the scope and breadth of the present invention.

The present invention extends the concepts described above to render a properly textured 3D image that cuts through two adjacent 2D images, using only bi-linear interpolation. FIG. 5A depicts an oblique slice 504 that intersects two parallel textures 506 and 502 at the intersections 508 and 510. Note that in this example, the circles 508 and 510 represents one or more vertices of the polygon 504, that intersects with the image planes 506 and 502, respectively.

Like the process described above, the process depicted by the flowchart in FIG. 5B also employs additive blending techniques. In addition, this process also draws the polygon associated with the slice 504 exactly two times to obtain an average. However, in this process, the colors of the vertices are calculated using a multiplication factor of either 1 or 0, depending on whether or not the vertex falls into the active texture. Specifically, a multiplication factor of 1 is used if the vertices fall into the active texture, and a multiplication factor of 0 is used if the vertices fall into the inactive texture.

Accordingly, the process begins with step 512, where control immediately passes to step 514. In step 514, the first texture 502 is enabled. Once this occurs, control passes to step 516. In step 516, the vertices associated with the polygon 504 are multiplied by a factor of 1, if they fall into the active texture, and multiplied by a factor of 0, if they fall into the inactive texture Specifically, in this example, the vertices associated with the intersection 510 are multiplied by 1, while the vertices associated with the intersection 508 are multiplied by 0. Note that in atypical application, wherein the polygon associated with the slice 504, is defined using 4 vertices, two vertices are associated with the intersecting plane 508, and two vertices are associated with the intersecting plane 510.

Next as indicated by step 518, the requested polygon associated with the slice 504 is drawn. When this occurs, the hardware accelerator maps the active texture 502 onto the requested polygon drawn in step 518, using bi-linear interpolation to determine the colors of the texels that lie between the vertices.

Once the polygon is drawn, control passes to step 518. In step 518, additive blending is enabled to prepare for the second drawing of the polygon 504, as described below. Control then passes to step 522.

In step 522, the second texture 506 is enabled. Control then passes to step 524. In step 524, the color associated with the vertices of the polygon 504 are calculated, using the same method in step 516. Thus, the vertices associated with the polygon 504 are multiplied by a factor of 1, if they fall into the active texture, and are multiplied by a factor of 0, if they fall into the inactive texture.

Note that this time, the texture 506 is now active and the texture 502 is now inactive. Accordingly, for the second pass, the vertices associated with the intersection 510 are multiplied by 0, while the vertices associated with the intersection 508 are multiplied by 1.

It should be noted that when the color of a vertex is multiplied by zero, this effectively sets the color to black. Conversely, when the color of a vertex is multiplied by 1, this effectively sets the color to the same color as was associated with the active texture.

Next, as indicated by step 526, the polygon is drawn a second time so that it is added to the first polygon drawn in step 518. The process then ends, as indicated by step 528.

Note that because of the way bi-linear interpolation works, when the first texture 502 is enabled, the pattern mapped onto the polygon is effectively multiplied by an increasing linear ramp that increases in intensity as the parts of the polygon get closer to the active image 502. That is, because the first two sets of vertices associated with the intersecting planes at 508 and 510, are set to 0 and 1, respectively, the hardware fills-in the intermediate texels with colors that begin very close to black (at intersection 508), and increase in intensity in a linear, fashion, as they approach the active texture at 510. The texels that approach the active texture 510 end with a color that is very close to the color defined for the texel associated with texture 502 at the intersection 510.

Subsequently, when the second polygon texture 506 is enabled, the pattern mapped into the polygon is effectively multiplied by a decreasing linear ramp that begins at a color very close to the active texture 506 at intersection 508 and decreases in intensity as the parts of the polygon get further away from the active texture, ending with a color that is very close to black at intersection 510.

When these two polygons are blended together, as a result of additive blending, an average of the two polygons result in the desired properly filtered image using only bi-linear interpolation.

Figure 6A:
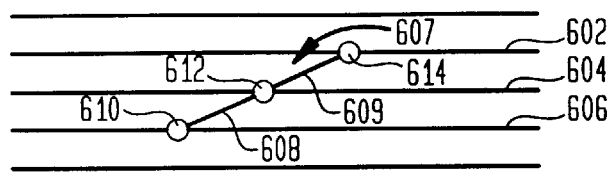
FIGS. 6A and 6B is a block diagram and a flowchart depicting a process that can be used for rendering a properly filtered image of a slice that intersects two or more parallel textures using only bi-linear interpolation techniques.
Figure 6B:
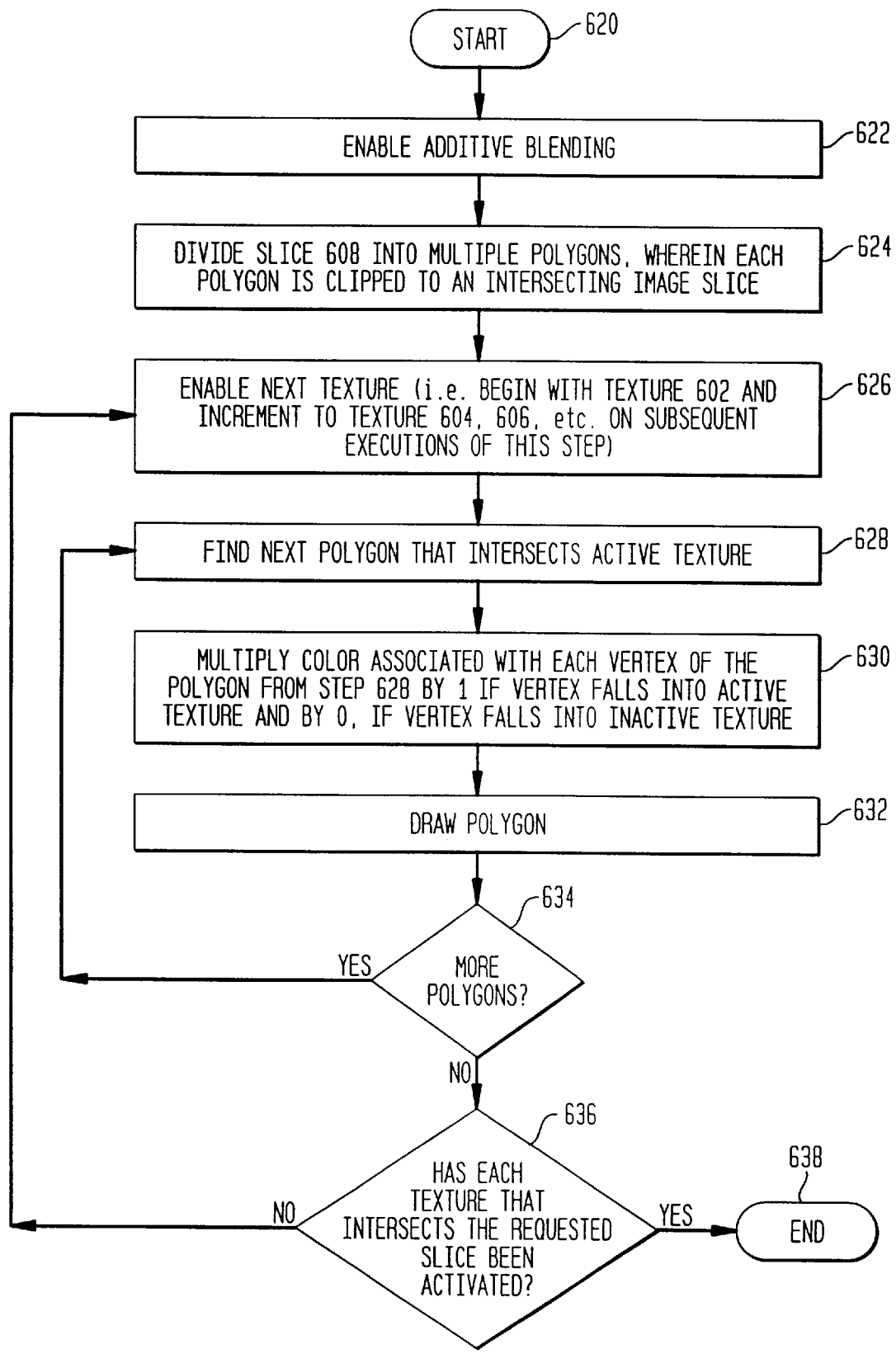

FIGS. 6A and 6B depicts a process that can be used to render any oblique slice using only bi-linear interpolation In this example, an oblique slice 607 is depicted that intersects three texture images 602, 604 and 606. This method can be used for any oblique slice that intersects two or more parallel texture images, such as the images 602–606.

The process begins with step 620, where control immediately passes to step 622. In step 622, additive blending is enabled. Control then passes to step 624. In step 624 the slice 607 is divided into multiple polygons, wherein each polygon is clipped to an image slice that intersects it. In this example, the polygon 607 is divided into two separate polygons 608 and 609. The first polygon 608 is that portion of the polygon 607 that begins at the intersection 610 and ends at the intersection 612. The second polygon 609 begins at the intersection 612 and ends at the intersection 614.

Before continuing with the process shown in the flowchart in FIG. 6B, a brief summary of the overall process is presented to aid in the present description. Each of the polygons defined in step 624 are drawn exactly twice, with additive blending enabled. The colors of the vertices are calculated as described above with reference to FIG. 5B. That is, a multiplication factor of 1 is used if the vertices fall into the active texture, and a multiplication factor of 0 is used if the vertices fall into the inactive texture. The complete image of the slice 607 comprises the composite of each of the polygons, rendered twice with additive blending enabled. In this fashion, the entire image associated with the slice 607 is rendered using only bi-linear interpolation.

Continuing with the flowchart in FIG. 6B, once the polygon 607 is divided into multiple polygons 608 and 609, control passes to step 626. In step 626, the next texture is enabled. In this example, the textures are enabled from the bottom up. Accordingly the first time this step is executed, texture 606 is enabled, followed by 604, 602, etc. Thus, because this if the first time step 626 is executed, the texture 606 is enabled, and thus becomes the active texture. Control then passes to step 628.

In step 628, the process determines the first polygon that intersects with the active texture. In this example, only one polygon, namely the polygon 608 intersects with the active texture 606. Control then passes to step 630.

In step 630, the process calculates the colors associated with the vertices of the polygon 608, using the same method as described above with reference to FIG. 5B. That is, the vertices associated with the polygon 608 are multiplied by a factor of 1, if they fall into the active texture, and are multiplied by a factor of 0, if they fall into the inactive texture. In this case, the vertices associated with the vertices represented by the intersection 610 are multiplied by a factor of 1, and the vertices represented by the intersection 612 are multiplied by a factor of 0. Control then passes to step 632.

In step 632, the polygon 608 is drawn, in this example, for the first time. Next, control passes to step 634. In step 634, the process determines if there are any additional polygons that intersect with the active texture 606. If so, control passes back to step 628, where steps 628–634 are repeated until all of the polygons that intersect with the texture 606 have been drawn. In this example, because only one polygon, namely the polygon 608, is the only polygon that intersects with the active texture 634, control passes to step 636.

In step 636, the process determines if there are any additional textures that intersect with the requested slice 607, that have not yet been activated. If there are, control passes back to step 626, where the next texture is enabled, and steps 626–636 are repeated until all of the textures have been enabled. If all textures have been enabled, then the process ends as indicated by step 638.

It should be noted that in general, step 634 will determine that there are exactly two polygons to be drawn for each enabled texture, except for the first and the last intersecting texture. Thus, for example, referring to FIG. 6A, when the texture 604 is enabled, both the polygons 608 and 609 are drawn in two passes of the loop in steps 626–634. The order in which the polygons are drawn does not matter and depends upon each specific implementation of the present invention.

However, note that by using the above method, each intersecting texture 602–606 is enabled exactly once, and each polygon 608–609 is rendered exactly twice. This is the preferred method because there is a cost in terms of performance for enabling a texture, and thus, should be kept at a minimum. The order in which the textures are enabled does not matter, as long as each texture is enabled exactly one time. This is typically accomplished by enabling each of the intersecting textures 602–06, successively, in a serial manner. The order in which one chooses to enable each texture depends on each specific implementation of the present invention.

Accordingly, the above technique described with reference to FIG. 6B allows one to draw any arbitrarily oriented oblique slice through a stack of 2D images at half the fill rate for bi-linearly filtered textures, plus an overhead of computing polygon coordinates. Half the fill rate is achieved because, as shown above, each of the polygons are drawn twice to achieve a properly bi-linearly filtered image.

Figure 7:
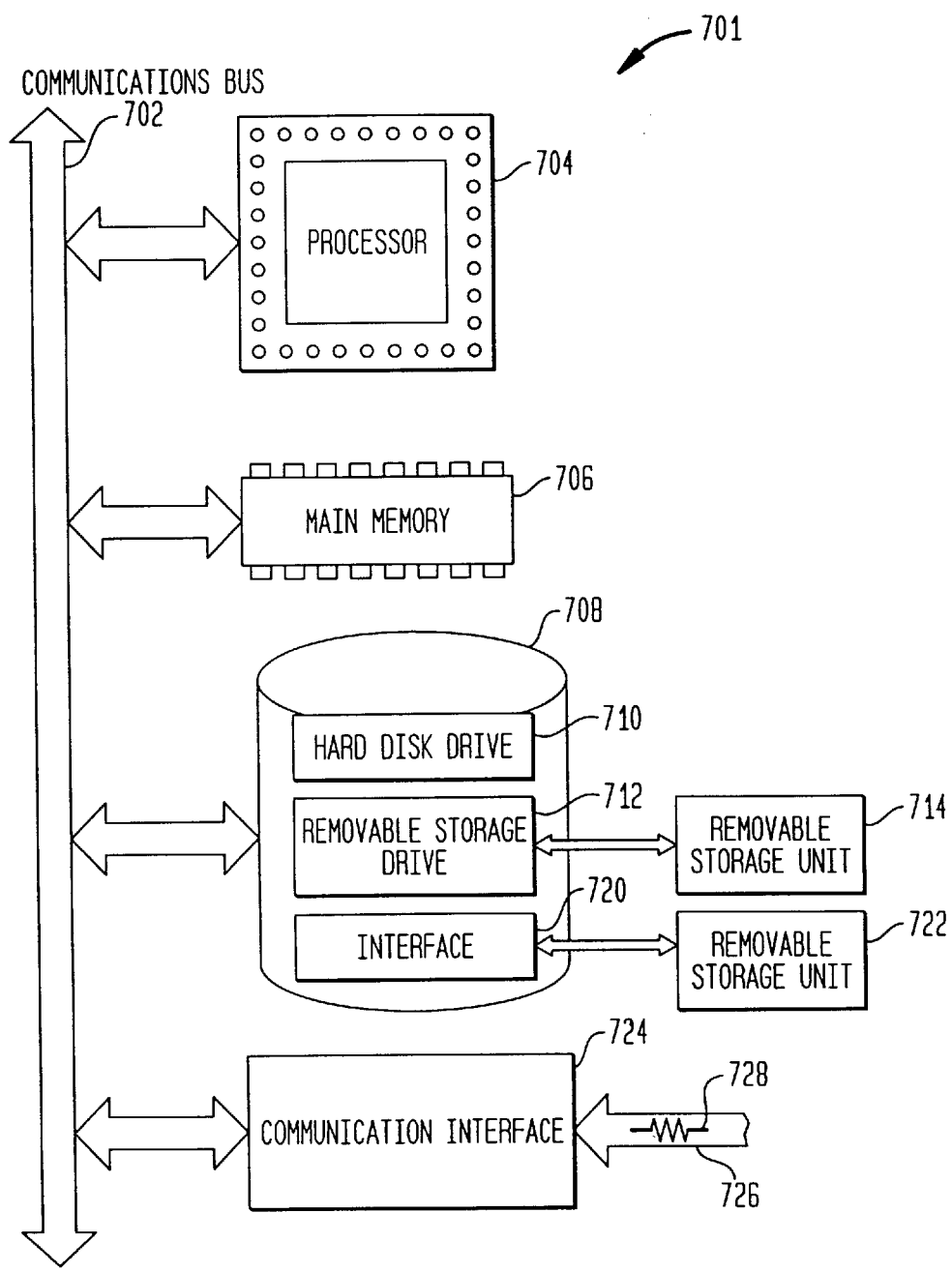
FIG. 7 is a block diagram of a computer useful for implementing components of the present invention.

The present invention may be implemented using hardware, software or a combination thereof and may be implemented in a computer system or other processing system. In fact, in one embodiment, the invention is directed toward a computer system capable of carrying out the functionality described herein. An example computer system 701 is shown in FIG. 7. The computer system 701 includes one or more processors, such as processor 704. The processor 704 is connected to a communication bus 702. Various software embodiments are described in terms of this example computer system. After reading this description, it will become apparent to a person skilled in the relevant art how to implement the invention using other computer systems and/or computer architectures.

Computer system 701 also includes a main memory 706, preferably random access memory (RAM), and can also include a secondary memory 708. The secondary memory 708 can include, for example, a hard disk drive 710 and/or removable storage drive 712, representing a floppy disk drive, a magnetic tape drive, an optical disk drive, etc. The removable storage drive 712 reads from and/or writes to a removable storage unit 714 in a well known manner. Removable storage unit 714, represents a floppy disk, magnetic tape, optical disk, etc. which is read by and written to by removable storage drive 712. As will be appreciated, the removable storage unit 714 includes a computer usable storage medium having stored therein computer software and/or data.

In alternative embodiments, secondary memory 708 may include other similar means for allowing computer programs or other instructions to be loaded into computer system 701. Such means can include, for example, a removable storage unit 722 and an interface 720. Examples of such can include a program cartridge and cartridge interface (such as that found in video game devices), a removable memory chip (such as an EPROM, or PROM) and associated socket, and other removable storage units 722 and interfaces 720 which allow software and data to be transferred from the removable storage unit 722 to computer system 701.

Computer system 701 can also include a communications interface 724. Communications interface 724 allows software and data to be transferred between computer system 701 and external devices. Examples of communications interface 724 can include a modem, a network interface (such as an Ethernet card), a communications port, a PCM-CIA slot and card, etc. Software and data transferred via communications interface 724 are in the form of signals which can be electronic, electromagnetic, optical or other signals capable of being received by communications interface 724. These signals 726 are provided to communications interface via a channel 728. This channel 728 carries signals 726 and can be implemented using wire or cable, fiber optics, a phone line, a cellular phone link, an RF link and other communications channels.

In this document, the terms "computer program medium" and "computer usable medium" are used to generally refer to media such as removable storage device 712, a hard disk installed in hard disk drive 710, and signals 726. These computer program products are means for providing software to computer system 701.

Computer programs (also called computer control logic) are stored in main memory and/or secondary memory 708. Computer programs can also be received via communications interface 724. Such computer programs, when executed, enable the computer system 701 to perform the features of the present invention as discussed herein. In particular, the computer programs, when executed, enable the processor 704 to perform the features of the present invention. Accordingly, such computer programs represent controllers of the computer-system 701.

In an embodiment where the invention is implemented using software, the software may be stored in a computer program product and loaded into computer system 701 using removable storage drive 712, hard drive 710 or communications interface 724. The control logic (software), when executed by the processor 704, causes the processor 704 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method for rendering an arbitrarily oriented three-dimensional image associated with a cross-sectional slice through a volumetric data set comprising axially aligned parallel stacks of two dimensional textured images, wherein the cross-sectional slice intersects with two or more of the textured images at intersecting planes, said method comprising the steps of:

enabling additive blending;

dividing the slice into one or more polygons, each bound by two of the intersecting planes;

defining an active texture associated with one of the intersecting planes;

identifying a first polygon that intersects with said active texture, calculating coordinates of vertices associated with said first polygon at the intersecting planes;

calculating the color of said vertices of said first polygon by performing the steps of:

setting the color of said vertices that intersect with said active texture to colors associated with the corresponding vertices from said active texture at the intersecting plane; and setting the color of said vertices that intersect with said texture that is not said active texture to a value that represents a lack of color; and issuing a command to draw said first polygon.

2. The method of claim 1, wherein said defining, identifying, determining, calculating and issuing steps are repeated until each said one or more polygons are drawn exactly twice, wherein for each drawing of said one or more polygons, a different one of said two intersecting planes binding each said one or more polygons is active in accordance with said defining step.

3. The method of claim 1, wherein said step of setting the color of said vertices that intersect with said intersecting plane that is not said active is accomplished by multiplying the color associated with vertices of said texture that is not said active texture by zero.

4. A method for rendering an arbitrarily oriented three-dimensional image associated with a cross-sectional slice through a volumetric data set comprising axially aligned parallel stacks of two dimensional textured images, wherein the cross-sectional slice intersects with two or more of the textured images at intersecting planes, said method comprising the steps of:

enabling additive blending;

dividing said slice into one or more polygons, each bound by two of the intersecting planes;

defining an active texture by successively enabling, in a serial manner, each of the textured images associated with the intersecting planes, and performing a rendering method for each said active texture, said rendering method comprising the steps of:

identifying a polygon that intersects with said active texture, determining vertices of said polygon by calculating coordinates of said intersecting planes associated with said polygon, multiplying the color associated with said vertices by one, if said vertices fall into said active texture, multiplying the color associated with said vertices by zero, if said vertices fall do not fall into said active texture, and drawing said polygon.

5. A computer program product comprising a computer useable medium having computer program logic stored therein, said computer program logic for enabling a computer to render an arbitrarily oriented three-dimensional image associated with a cross-sectional slice through a volumetric data set comprising axially aligned parallel stacks of two-dimensional textured images, wherein the cross-sectional slice intersects with two or more of the textured images at intersecting planes, wherein said computer program logic comprises:

means for enabling the computer to enable additive blending;

means for enabling the computer to define a polygon coincident with the cross-sectional slice;

means for enabling the computer to divide said polygon into one or more divided polygons, each having a first end and a second end, wherein said first end and said second end is bound to one of the intersecting planes;

means for enabling the computer to define an active texture by successively enabling, in a serial manner, each of the textured images associated with the intersecting planes, and repeatedly performing a rendering method for each said active texture, said rendering method comprising the steps of:

means for enabling the computer to identify one or two polygons that intersect with said active texture, means for enabling the computer to determine vertices of said one or two polygons by calculating coordinates of said intersecting planes associated with said one or two polygons, means for enabling the computer to multiply the color associated with said vertices by one, if said vertices fall into said active texture, means for enabling the computer to multiply the color associated with said vertices by zero, if said vertices fall do not fall into said active texture, and means for enabling the computer to draw said one or two polygons.

6. An apparatus for rendering an arbitrarily oriented three-dimensional image associated with a cross-sectional slice through a volumetric data set comprising axially aligned parallel stacks of two-dimensional textured images, wherein the cross-sectional slice intersects with two or more of the textured images at intersecting planes, said apparatus comprising:

enabling means for enabling additive blending;

dividing means for dividing the slice into one or more polygons, each bound by two of the intersecting planes;

activating means for defining an active texture associated with one of the intersecting planes;

identifying means for identifying a first polygon that intersects with said active texture, calculating means for calculating coordinates of vertices associated with said first polygon at the intersecting planes;

color means for setting the color of said vertices of said first polygon by setting the color of said vertices that intersect with said active texture to colors associated with the corresponding vertices from said active texture at the intersecting plane; and setting the color of said vertices that intersect with said texture that is not said active texture to a value that represents a lack of color; and drawing means for drawing said first polygon.

7. The apparatus of claim 6, wherein said activating, identifying, calculating, color and drawing means are used to render each said one or more polygons exactly twice, wherein for each rendering of said one or more polygons, a different one of said two intersecting planes binding each said one or more polygons is active in accordance with said activating means.

8. The apparatus of claim 6, wherein said color means includes setting the color of said vertices that intersect with said intersecting plane that is not said active texture to zero.

9. A system for rendering an arbitrarily oriented three-dimensional image associated with a cross-sectional slice through a volumetric data set comprising axially aligned parallel stacks of two[]dimensional textured images, wherein the cross-sectional slice intersects two or more of the textured images at intersecting planes, said system comprising:

a general purpose computer system;

a three-dimensional graphics accelerator coupled to said computer system that supports at least the features of additive blending, two-dimensional texture mapping, and bi-linear interpolation;

means for dividing the cross sectional slice into one or more polygons, each polygon having a first end and a second end, wherein said first end and said second end coincides with one of the intersecting planes;

means for enabling, in a serial manner, each of the textured images associated with the intersecting planes to define an active texture to be mapped by said graphics accelerator;

means for enabling the computer to identify intersecting polygons that intersect with said active texture;

means for determining intersecting vertices of said intersecting polygons by calculating coordinates of said intersecting planes associated with said intersecting polygons, means for calculating the colors associated with said intersecting vertices by multiplying the color of the intersecting vertices by one, if said intersecting vertices fall into said active texture, and by zero, if said vertices fall do not fall into said active texture, and means for enabling the graphics accelerator to draw each said intersecting polygons with said feature of additive blending enabled, to thereby render a properly filtered textured image associated with the slice.

* * * * *